March 10, 1964 R. M. MIHALEK 3,124,724
CONTROL CIRCUIT
Filed Oct. 11, 1961
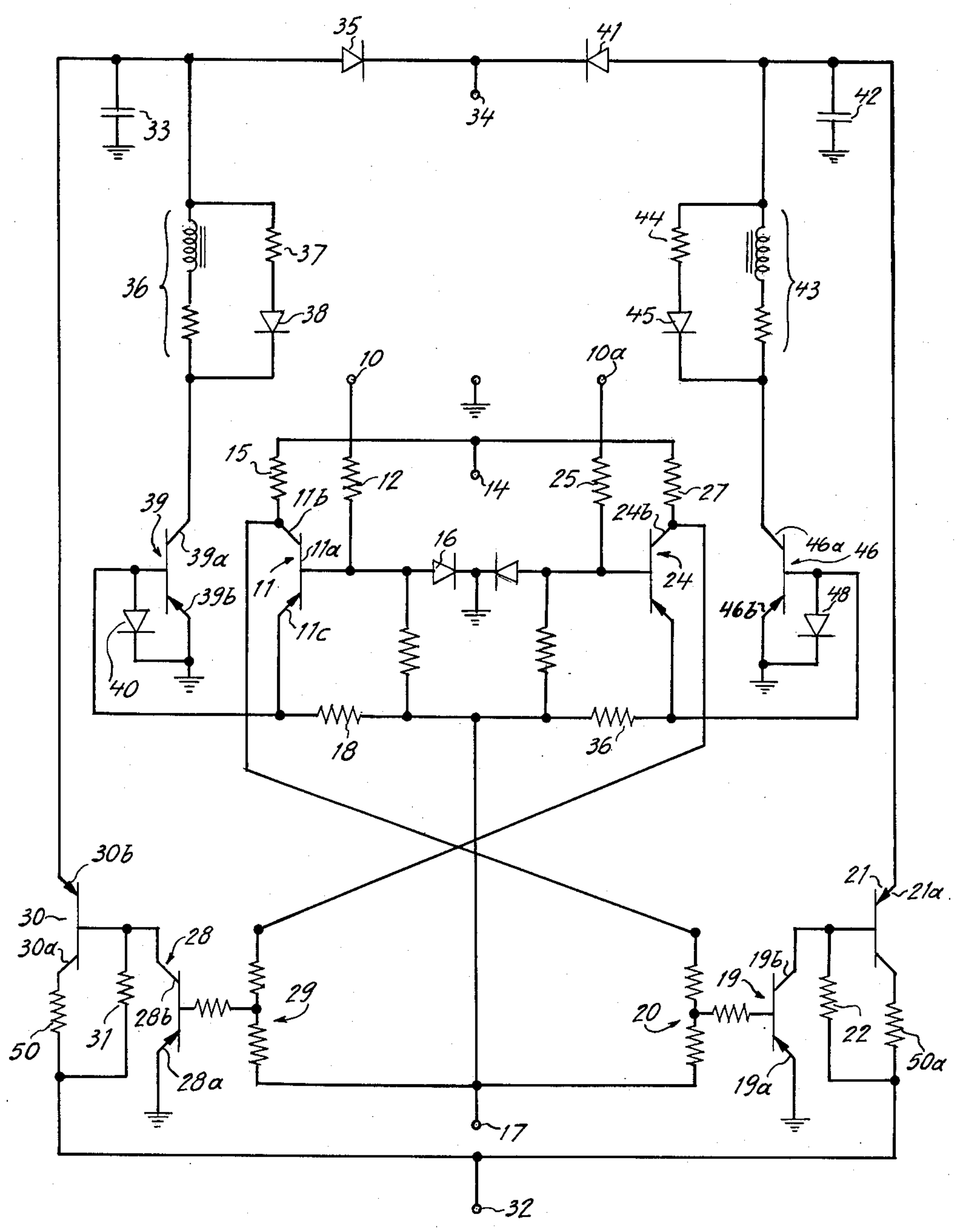
INVENTOR
ROBERT M. MIHALEK
BY [signature]
ATTORNEY United States Patent Office 3,124,724
Patented Mar. 10, 1964

3,124,724

CONTROL CIRCUIT

Robert M. Mihalek, Redding, Conn., assignor to Sperry Rand Corporation, New York, N.Y., a corporation of Delaware Filed Oct. 11, 1961, Ser. No. 144,345
5 Claims. (Cl. 317—148.5)

This invention relates to an improved control circuit. More particularly it relates to a control circuit capable of supplying both short-term high power and steady state lower power to one of two loads. The novel control circuit to be described is, in addition, capable of high speed switching between loads and has negligible power dissipation.

One use for a control circuit such as is defined above is to control high speed devices used as outputs of electronic data processing equipment. In such applications the signal coming from the central equipment to control the output device will normally be of the order of only a few milliamperes. The control circuit must be capable of accepting such a signal and producing, in response, the substantial power needed to control the mechanical output equipment. To this is added the requirement that the control circuit must produce this high power at high enough speed to permit a sufficiently high velocity profile for the mechanical equipment. Next, since there are many of these control circuits they must have low, steady state power dissipation both from a cost standpoint and to avoid heat removal problems. And, finally, it is desirable that such control circuits operate with low voltage supplies to achieve the very practical advantage of eliminating the hazard of serious shock.

Accordingly, it is an object of this invention to provide an improved control circuit.

A further object of this invention is to provide a high speed control circuit using solid state devices which produces in response to a very small signal at an input thereof, a high power output at one of two loads.

A still further object of this invention is to provide a high speed, solid state control circuit which can provide high peak power and lower steady state power to one of two loads in response to a very small input signal thereto, and with low power dissipation.

Still another object of this invention is to provide a high speed solid state control circuit requiring relatively low voltage supplied.

Other and further objects and advantages of this invention will become apparent when the following description is read in conjunction with the accompanying drawing, and the scope of the invention is pointed out with particularity in the appended claims.

Briefly stated, in accordance with this invention a circuit is provided which, in response to an input signal of a low level, will provide a high current flow through an electrical device for a fixed period and thereafter with no further signal will provide a current flow at a reduced rate through that same element for the duration of the input signal with minimum power dissipation.

The single figure shows a preferred embodiment of the control circuit. In this figure input terminal 10 is connected to the base 11*a* of a transistor 11 through a resistance 12. Base 11*a* is held substantially at ground by diode clamp 16, poled so as to be conductive from base 11*a* to ground. Transistor 11 has its emitter 11*c* connected to the base of a transistor 39. The collector 11*b* of transistor 11 is connected to a potential source 14 through a resistance 15. In the embodiment shown, potential source 17 might be of the order of +15 volts, and potential source 14 of the order of —15 volts.

Collector 11*b* of transistor 11 is also connected to the base of transistor 19 through an impedance pad indicated at 20. The emitter 19*a* of transistor 19 is grounded and the collector 19*b* is connected to the base of transistor 21. Resistance 22 is a current limiting resistance for the base-emitter junction of transistor 21.

A second input terminal 10*a* is connected to the base of a transistor 24 through a resistor 25. The collector 24*b* of transistor 24 is connected to potential 14 through resistance 27 and is also connected to the base of transistor 28 through an impedance pad indicated at 29. The emitter 28*a* of transistor 28 is grounded and the collector 28*b* is connected to the base of transistor 30. Resistance 31 is a current limiting resistance for the base-emitter junction of transistor 30.

Collector 30*a* of transistor 30 is connected to voltage source 32 through current limiting resistance 50. Source 32 in the embodiment shown might be of the order of —65 volts.

Emitter 30*b* of transistor 30 is connected to a capacitor 33, as shown, to permit the capacitor to be charged to the approximate value of source 32 when transistor 30 is conductive. The junction of transistor 30 and capacitor 33 is connected to an electromechanical device 36 such as a solenoid.

Also connected to solenoid 36, through a unidirectional element 35 poled as shown, is a second voltage source 34. In this embodiment source 34 might be of the order of —6 volts.

The other terminal of solenoid 36 is connected to the collector 39*a* of transistor 39. A network is provided in parallel with solenoid 36 consisting of a resistance 37 and a unidirectional element 38 to control the speed of circuit response when, for example, current through solenoid 36 is terminated.

The emitter 39*b* of transistor 39 is connected to ground and the base of transistor 39 is connected to source 17 through resistance 18. A unidirectional element 40 is connected between the base of transistor 39 and ground, poled so as to be conductive toward ground.

If transistor 39 is made conductive when transistor 30 is cut off then, with the arrangement shown, capacitor 33 will discharge through solenoid 36 until its charge is equal to the value of voltage source 34. At that time the current flow is automatically sustained from ground through transistor 39, solenoid 36, unidirectional element 35 to negative source 34 without the need for additional signals. Further, it is obvious that standby current is achieved without using massive resistance, thus avoiding great dissipation.

The emitter 21*a* of transistor 21 is connected to capacitor 42 in a similar manner and for the same purpose as the connection of transistor 30 and capacitor 33.

Capacitor 42, again like its counterpart capacitor 33, is connected to a second solenoid 43 which, in turn, is connected to collectors 46*a* of a transistor 46. A network path including resistance 44 and unidirectional element 45 is provided in parallel with solenoid 43 for reasons discussed above in connection with the corresponding path in parallel with solenoid 36.

The emitter 46*b* of transistor 46 is connected to ground, and the base of transistor 46 is connected to source 17 through resistance 36. A unidirectional element 48 is connected between the base of transistor 46 and ground and poled so as to be conductive toward ground.

Voltage source 34 is connected to solenoid 43 through unidirectional element 41 as shown.

The circuit just described functions as follows:

Negative going input signals may be applied between ground and terminal 10 or between ground and terminal 10*a*. Assuming a negative input of the order of 10 volts between ground and terminal 10, a current will be applied to the base emitter junction 11*a* of transistor 11. Transistor 11 will thereupon be made conductive providing a signal to the base of transistor 19 through impedance pad 20, turning that transistor off. Similarly, the junction of resistance 18 and the base of transistor 39 drops when transistor 11 conducts turning that transistor on. When transistor 39 is on, capacitor 33 which previously had been charged substantially to the value of potential source 32 is permitted to rapidly discharge through solenoid 36 until its value equals that of potential source 34 at which time potential source 34 automatically provides a holding current for the solenoid.

During this time transistor 21 which had been held nonconductive when transistor 19 was conducting because of the substantially ground voltage at its base, becomes conductive when transistor 19 is turned off. This permits capacitor 42 to become charged to the value of voltage source 32.

The absence of an input signal between ground and terminal 10*a* causes transistor 24 to be non-conductive. As a consequence there is no input signal to transistor 28 and that latter transistor is conductive. Since there is substantially ground potential appearing at the base of transistor 30, transistor 30 is non-conductive and voltage source 32 is effectively disconnected from the left side of the transistor.

Thus in response to a single input, peak power is applied to a solenoid by discharging a capacitor and steady state power is automatically switched in to "hold" the solenoid when the capacitor has discharged to a predetermined value. In the meantime the other half of the circuit is recharging its associated capacitor to prepare it for the occurrence of an input which will activate that side.

While there has been shown and described what is considered to be a preferred embodiment of this invention, it will be understood by those skilled in the art that changes in modifications can be made without departing from the spirit and scope of the invention. For example, it would be simple to arrange the input terminals such that, in the absence of an input signal, one half of the circuit is always activated and its solenoid energized. In this case the input signal would be effective to charge the circuit conductivity pattern activating the other side of the circuit and permitting the recharge of the "first side" capacitor. Accordingly, the scope of the invention is intended to be limited only by the appended claims.

What is claimed is:

1. A circuit using solid state components for supplying peak power and steady state power at separate levels to at least a pair of electromechanical devices being alternately energized at high speeds comprising a functionally symmetric branch for each electromechanical device of said pair, each branch including a source of peak power, transistor switch means for controlling the application of said peak power to said device, a source of steady state power, unidirectional means for connecting said steady state power to said device when said peak power drops to a predetermined level, a source of recovery energy, means interconnecting said circuit branches, said last named means selectively connecting said source of recovery energy to said peak power source and simultaneously disconnecting said steady power source from said device, said last named means further permitting peak power or steady state power to be applied to only one of said devices at a time.

2. A circuit having at least a pair of capacitors comprising a substantially symmetrical circuit branch for each of said capacitors, one of said branches including a normally open discharge path, the other said branches including a normally closed discharge path, each discharge path comprising in series, a solenoid and a first transistor amplifier, input means for changing the conductivity state of said first transistor amplifier to thereby change the condition of said discharge path, said one of said branches further including a normally closed charging circuit for charging said capacitor, said other of said branches further including a normally open charging circuit, each of said charging circuits including in series a second transistor amplifier and a source of charging energy, said input means further changing the conductivity state of said second transistor amplifier thereby opening said charging circuit in said one circuit branch when it closes said discharge circuit thereof, means for maintaining current through said discharge path at a lower level after the discharge of said capacitor until the conductivity state of said first transistor is changed, and means interconnecting said first and second branches so that a change in charge or discharge path conditions in one branch is accompanied by an opposite change in the same path in the other of said branches.

3. A control actuating circuit for providing both actuating and holding power to at least a pair of controls with negligible power dissipation, in response to signals at an input terminal comprising at least a solenoid actuating each of said controls, a circuit for each of said solenoids, each circuit including in series a peak power source, said solenoid and a first transistor, a second transistor connected to said first transistor for applying an input signal thereto, said first transistor being normally non-conductive and being made highly conductive for the duration of said input signal, a unidirectional element having one side connected to the junction of said peak power source and said device, a source of holding power connected to the other side of said unidirectional elements, a recovery circuit for said peak power source including in series a third transistor amplifier and a source of recovery energy, and means including a fourth transistor connected between said second transistor of one circuit and said third transistor of said other circuit for making said third transistor of one circuit and said first transistor of the other circuit highly conductive at the same time and means for providing an input signal to either second transistor.

4. A bistable circuit comprising a first circuit branch having a first capacitor, a source of potential, a charging path for said first capacitor including a first transistor connecting said source to said first capacitor, a discharge path for said first capacitor, including a first electromechanical device connected to the junction of said first capacitor and said first transistor and a second transistor connecting said first electromechanical device to a source of reference potential, a second circuit branch having a second capacitor, a charging path for said second capacitor including a charging path for said capacitor including a third transistor connecting said source to said second capacitor, a discharge path for said second capacitor including a second electromechanical device connected to the junction of said second capacitor and said third transistor, and a fourth transistor connecting said second electromechanical device to said source of reference potential, input means for applying an amplifier input signal to one of said branches, said input means including a fifth transistor connected to said second transistor and a sixth transistor connected to said fourth transistor, whereby an input signal applied to said fifth transistor will permit said first capacitor to discharge and a signal applied to said sixth transistor will permit said second capacitor to discharge, and means connecting said input means to said charge paths, said last named means including a seventh transistor connecting said fifth transistor to said third transistor, and an eighth transistor connecting said sixth transistor to said first transistor whereby when either said first or said second branch discharge path is actuated said corresponding charge path is deactivated, and when the other discharge path is deactivated its corresponding charge path is activated.

5. The circuit described in claim 4 and further including a second source of potential having a level between said first source and said reference potential, first and second unidirectional elements connecting said second source to the junction respectively of said first capacitor and first electromechanical device and to the junction of said second capacitor and second electromechanical device, said unidirectional elements being arranged so that energy from said second source will flow through the activated discharge path when the charge on the capacitor is equal thereto.

References Cited in the file of this patent

UNITED STATES PATENTS

| | | |
|---|---|---|
| 2,788,473 | Breckman | Apr. 9, 1957 |
| 2,925,585 | Bruce | Feb. 16, 1960 |
| 2,997,632 | Shepard | Aug. 22, 1961 |
| 3,018,419 | Bonn | Jan. 23, 1962 |